Oct. 25, 1949.  J. B. EDSON  2,485,870
ROCKET TARGET
Filed Dec. 13, 1944  2 Sheets-Sheet 1
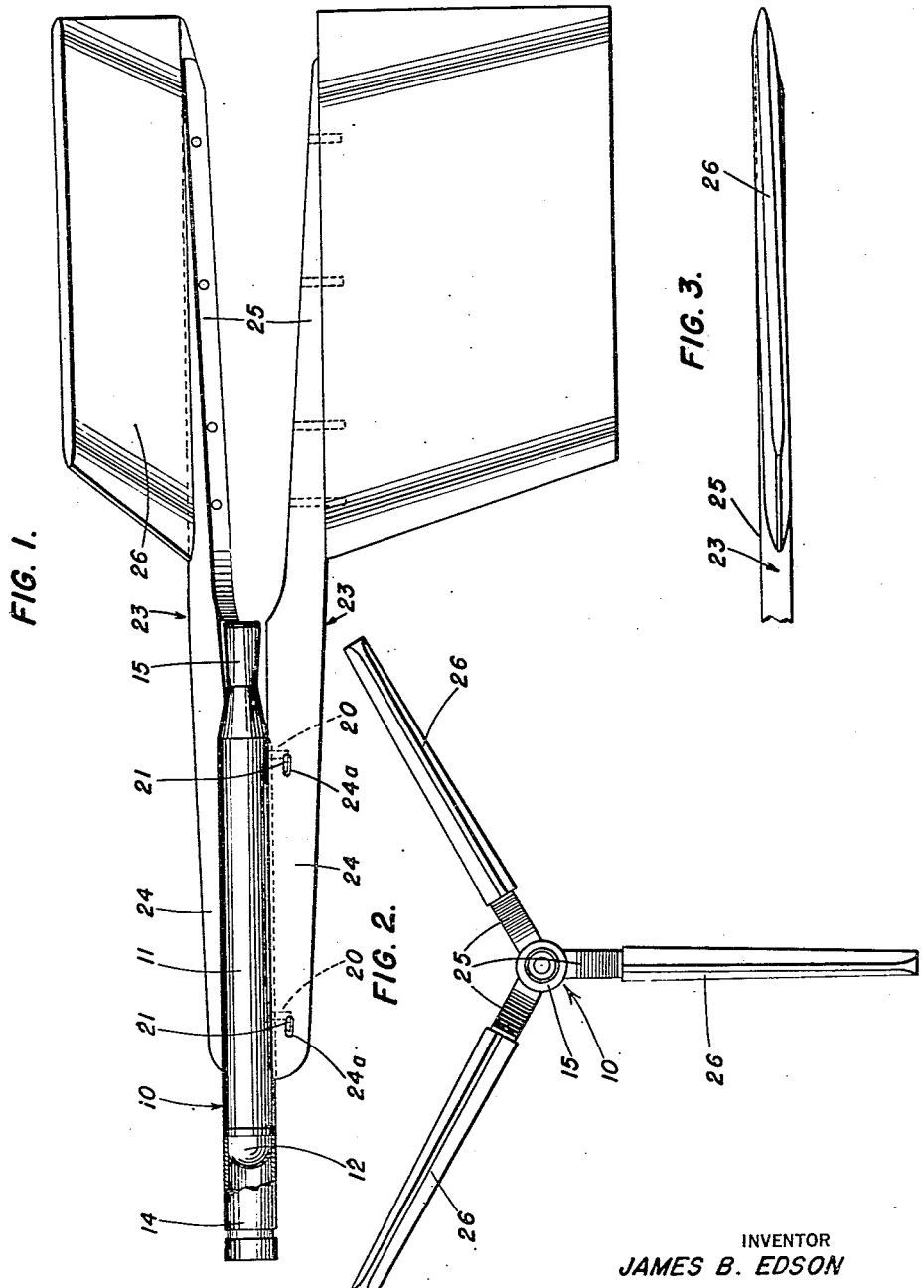
INVENTOR
JAMES B. EDSON
BY
ATTORNEY Oct. 25, 1949.   J. B. EDSON   2,485,870
ROCKET TARGET
Filed Dec. 13, 1944   2 Sheets-Sheet 2
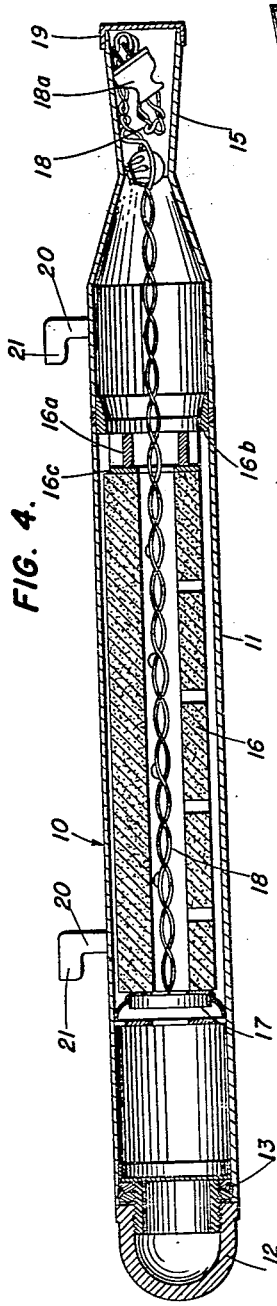
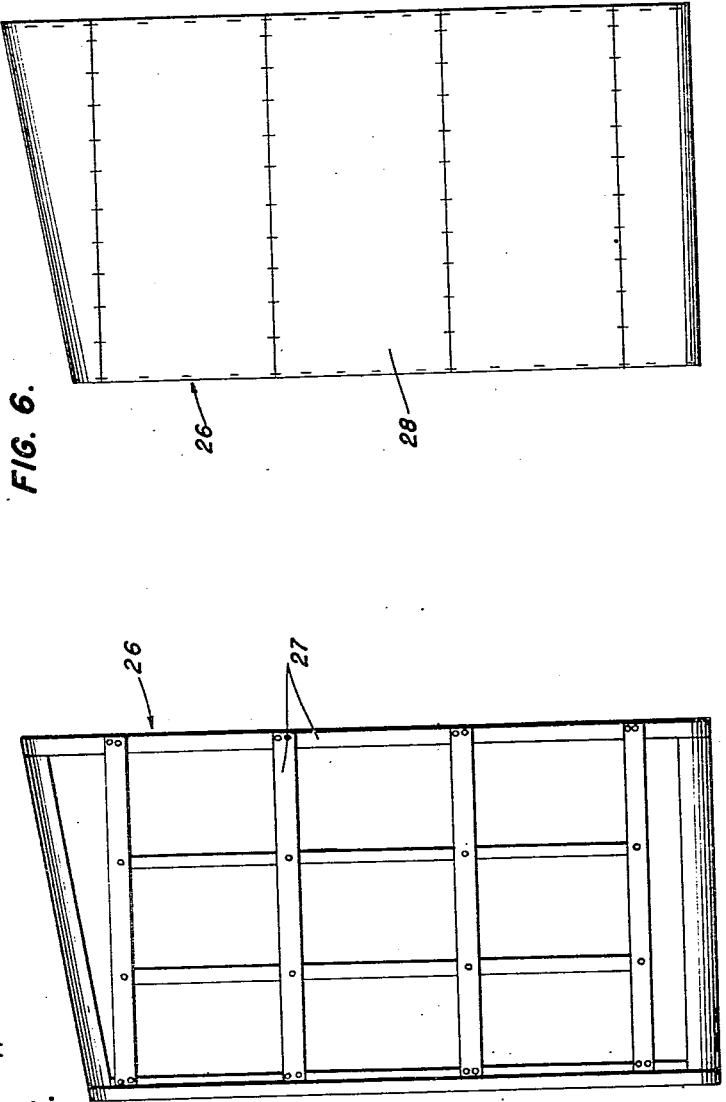
INVENTOR
JAMES B. EDSON
BY
ATTORNEY Patented Oct. 25, 1949

2,485,870

UNITED STATES PATENT OFFICE 2,485,870

ROCKET TARGET

James Brown Edson, Havre de Grace, Md., assignor to the United States of America, as represented by the Secretary of the Navy Application December 13, 1944, Serial No. 568,016

2 Claims. (Cl. 102—51)

This invention relates to rocket targets and has particular reference to a novel rocket target including a rocket motor for propelling it through the air within range of anti-aircraft batteries to provide a moving target and aid in improving anti-aircraft marksmanship.

One object of the present invention resides in the provision of a rocket target which is inexpensive to manufacture, so that it may be used and expended in quantity for improvement of anti-aircraft marksmanship, with reasonable economy.

Another feature of the invention is to provide a rocket target which has dependable and predictable flight characteristics.

Another object is to provide a rocket target which is stable in flight and has a small dispersion so that it may be directed close to the gun station or gun battery for certain types of anti-aircraft practice.

Still another object of the invention is to provide a rocket target which is so constructed that it offers relatively slight air resistance and is of relatively light weight to insure satisfactory range and velocity.

An additional object is to provide a target rocket which, although it is relatively light and streamlined to offer slight resistance, has relatively large fins so as to be readily visible to the gun crew.

Another object of the invention is to provide a rocket target which may be readily assembled and disassembled, the disassembled parts being adapted for compact arrangement to facilitate storage and shipment.

The further object is to provide a rocket target in which the rocket nozzle is located approximately at the center of gravity of the rocket target, so that yaw, due to malalinement of the nozzle with respect to the rocket motor, is virtually eliminated.

These and other objects of the invention may be better understood by reference to the accompanying drawings, in which Figure 1 is a side view of a rocket target made in accordance with the invention, with a part of the target shown in section;

Figure 2 is a rear elevational view of the rocket target;

Figure 3 is a fragmentary edge view of one of the fins;

Figure 4 is an enlarged longitudinal sectional view of the rocket motor;

Figure 5 is a side view of the fin frame before the skin is applied, and

Figure 6 is a view similar to Figure 5 but showing the completed fin.

The rocket motor, designated generally by the reference number 10, includes an elongated cylindrical tube 11 which may be made of metal and is closed at its front end by a nose cap 12. The cap 12 is secured to the tube in an air-tight manner, as shown at 13. For some purposes, the front end of the motor may be provided with a whistle 14 of any well-known type which is operated by the air pressure incident to flight of the rocket body. The connection 13 between the cap 12 and the motor tube 11 is so arranged that the cap may be connected just before the rocket target is to be fired, so that during shipment both ends of the rocket tube are open. At its rear end, the motor tube 11 is provided with a nozzle 15 through which the products of combustion in the rocket motor are discharged.

The tube 11 contains a powder grain 16, which may be of the form disclosed in a copending application of Bruce H. Sage et al. Serial No. 479,538, and an electrical igniter 17 to which ignition wires 18 are attached for leading outward through the nozzle 15. The powder grain 16, as shown, is supported at its rear end by a grid 16a mounted on a grid ring 16b welded or otherwise secured in motor tube 11, a nitrocellulose washer 16c being interposed between the grid and the powder grain. The igniter 17 may take any suitable form, such as that disclosed as a copending application of Bruce H. Sage, et al., Serial No. 481,653. Prior to use of the target, the ignition wires 18 and a suitable contact plug 18a connected thereto are stored in the outer part of the nozzle 15, and the nozzle is provided with an easily ruptured, removable cap or cover 19 for retaining the wires and plug in the rocket motor and protecting the parts in the motor. When the rocket target is ready for use, the cap 19 is removed, and the plug 18a is withdrawn from the nozzle and connected to an energizing source of the rocket launcher (not shown). A similar removable cap (not shown) may cover the forward end of the motor tube 11 in place of the nozzle cap 12 during shipment. Thus, during shipment, the rocket motor is inert or non-propelling. That is, in the event the propellent or powder grain 16 should be ignited, the products of combustion may escape from both ends of the rocket motor and the latter will not be propelled.

The motor tube 11 is provided on its outer cylindrical surface with several sets of radially directed lugs 20, each set comprising at least two lugs which are longitudinally aligned on the tube. The lugs 20 may be welded or otherwise secured to the motor tube, and the extremity of each lug has a forwardly disposed, transversely extending portion forming a hook 21, the purpose of which will be described presently. One lug of each set is located immediately forward of the nozzle 15, while the other lug is located near the forward end of the motor tube 11. A longeron 23 is removably secured to each pair of lugs 20. Each of the longerons, preferably three in number, is formed of wood or other suitable material and comprises a forward or mounting portion 24, the inner edge of which is curved in conformity with the adjacent outer surface of the tube 11, and a tail portion 25 extending rearwardly beyond the nozzle 15. The mounting portion 24 of each longeron has a pair of elongated recesses 24a for receiving and interlocking with the hook portions 21 of the corresponding lugs 20. Each longeron is connected to the tube 11 by inserting the adjacent hooks 21 through the recesses 24a. The hooks 21 may be provided at their free ends with suitable detents or other means (not shown) for holding the longerons in locked relation on the hooks during flight of the rocket target while permitting easy removal of the longerons when the device is not in use, as by sliding the longerons forwardly on the motor tube to disengage the detent or other retaining means.

The inner edge of the tail portion 25 of each longeron diverges from the axis of the motor 10 as the longeron extends rearwardly from the nozzle 15. More particularly, the inner surfaces of the longeron tail portions 25 are shaped to define or delineate the boundaries of the rocket blast which issues from the nozzle 15.

The tail portion of each longeron carries a radiating fin 26 which is preferably stream-lined in the direction of the axis of the rocket target. Each fin comprises a light frame-work 27 made of wood, or other suitable material, as shown in Figure 5, the sides of the frame being provided with suitable covering material 28 (Figure 6). The fins 26 are secured to the longeron rear portions 25 in any suitable manner and are preferably set on a slight angle so as to cause the rocket to rotate in its flight through the air, thereby neutralizing any differences in drag between the fins. The fin covering 28 may be of any suitable material, such as fabric, paper, etc.

Because of the longerons 23, the entire rocket motor 10 is located in front of the fins 26 so that the center of thrust of the motor is forward of the center of drag. As a result, the rocket target has particularly stable flight characteristics.

An important feature of the present invention resides in so proportioning the masses of the various parts of the target rocket that the thrust of the rocket nozzle 15 is located at the center of gravity of the assembled rocket target. This is a particularly advantageous feature for the reason that yaw, due to malalignment of the nozzle with respect of the axis to the rocket motor, is virtually eliminated.

The rocket target of the present invention is of simple construction, has relatively few parts, and may be readily assembled or disassembled by reason of the releasable connections between the rocket motor and the longerons 23. By providing the longerons for mounting the fins 26 to the rear of the motor nozzle, I not only improve the flight characteristics by locating the center of drag to the rear of the center of thrust, but I also make it possible, by simply employing fins 26 of the proper mass, to locate the center of gravity of the entire rocket target at the region of thrust of the motor nozzle 15, as described. The relatively large fins 26 serve not only to rotate the target and stabilize it in flight, but also to provide large surfaces which are easily visible to the antiaircraft gunners.

I claim:

1. A rocket target comprising a rocket motor having a discharge nozzle at its rear end, longerons removably mounted on the rocket motor and having tail portions extending to the rear of said nozzle, and radial fins mounted on said tail portions to the rear of the nozzle, the center of gravity of the entire mass including the motor, longerons, and fins being located in the region of said nozle whereby inaccuracies in the alignment of said nozzle wtih respect to the longitudinal axis of the rocket motor exert a relatively small turning moment on the rocket target during operation of said rocket motor.

2. A rocket target comprising a rocket motor having a discharge end, a plurality of longerons extending lengthwise of the motor along the outside thereof and projecting to the rear of the discharge end of the motor, releasable connecting means between the motor and the longerons for holding the longerons in position on the motor, and radiating fins mounted on the rear end portions of the longerons and disposed to the rear of the discharge end of said motor, said fins being mounted on the longerons at an angle to cause rotation of the rocket target during its flight.

JAMES BROWN EDSON.

REFERENCES CITED

The following references are of record in the file of this patent:

UNITED STATES PATENTS

| Number | Name | Date |
| --- | --- | --- |
| 229,086 | Bray | June 22, 1880 |
| 981,357 | Babbitt | Jan. 10, 1911 |

FOREIGN PATENTS

| Number | Country | Date |
| --- | --- | --- |
| 126,664 | Great Britain | May 22, 1919 |
| 106,242 | Australia | Apr. 25, 1927 |
| 377,613 | Italy | Dec. 23, 1939 |